United States Patent
Yokoi et al.

(10) Patent No.: US 7,826,119 B2
(45) Date of Patent: Nov. 2, 2010

(54) LIGHT SCANNING DEVICE

(75) Inventors: Junichi Yokoi, Toyoake (JP); Toshio Sakai, Nagoya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 317 days.

(21) Appl. No.: 12/021,674

(22) Filed: Jan. 29, 2008

(65) Prior Publication Data

US 2009/0046342 A1  Feb. 19, 2009

(30) Foreign Application Priority Data

Jan. 29, 2007 (JP) ............... 2007-018278
May 30, 2007 (JP) ............... 2007-143200

(51) Int. Cl.
*G02B 26/08* (2006.01)
(52) U.S. Cl. .................................. 359/224.1
(58) Field of Classification Search ... 359/223.1–226.1, 359/212.1–214.1
See application file for complete search history.

(56) References Cited

U.S. PATENT DOCUMENTS 7,154,652 B2  12/2006  Kobayashi
7,155,081 B2  12/2006  Miyajima et al.
2002/0163702 A1 * 11/2002  Hori et al. ............... 359/204

FOREIGN PATENT DOCUMENTS

| JP | 11-227251 | 8/1999 |
| JP | 2003-107388 | 4/2003 |
| JP | 2004-198500 | 7/2004 |
| JP | 2004-226651 | 8/2004 |
| JP | 2005-156976 | 6/2005 |

* cited by examiner

*Primary Examiner*—Euncha P Cherry
(74) *Attorney, Agent, or Firm*—Banner & Witcoff, Ltd.

(57) ABSTRACT

A light scanning device includes: a light source which emits light; a frame which supports the light source; an oscillating mirror which rotationally oscillates about a first axis to reflect the light emitted from the light source; a mirror holder which holds the oscillating mirror; a beam member which extends in a first direction orthogonal to the first axis and which is longer than the mirror holder in the first direction; a first fixing member which fixes the mirror holder to the beam member; and a second fixing member which fixes the beam member to the frame.

26 Claims, 16 Drawing Sheets

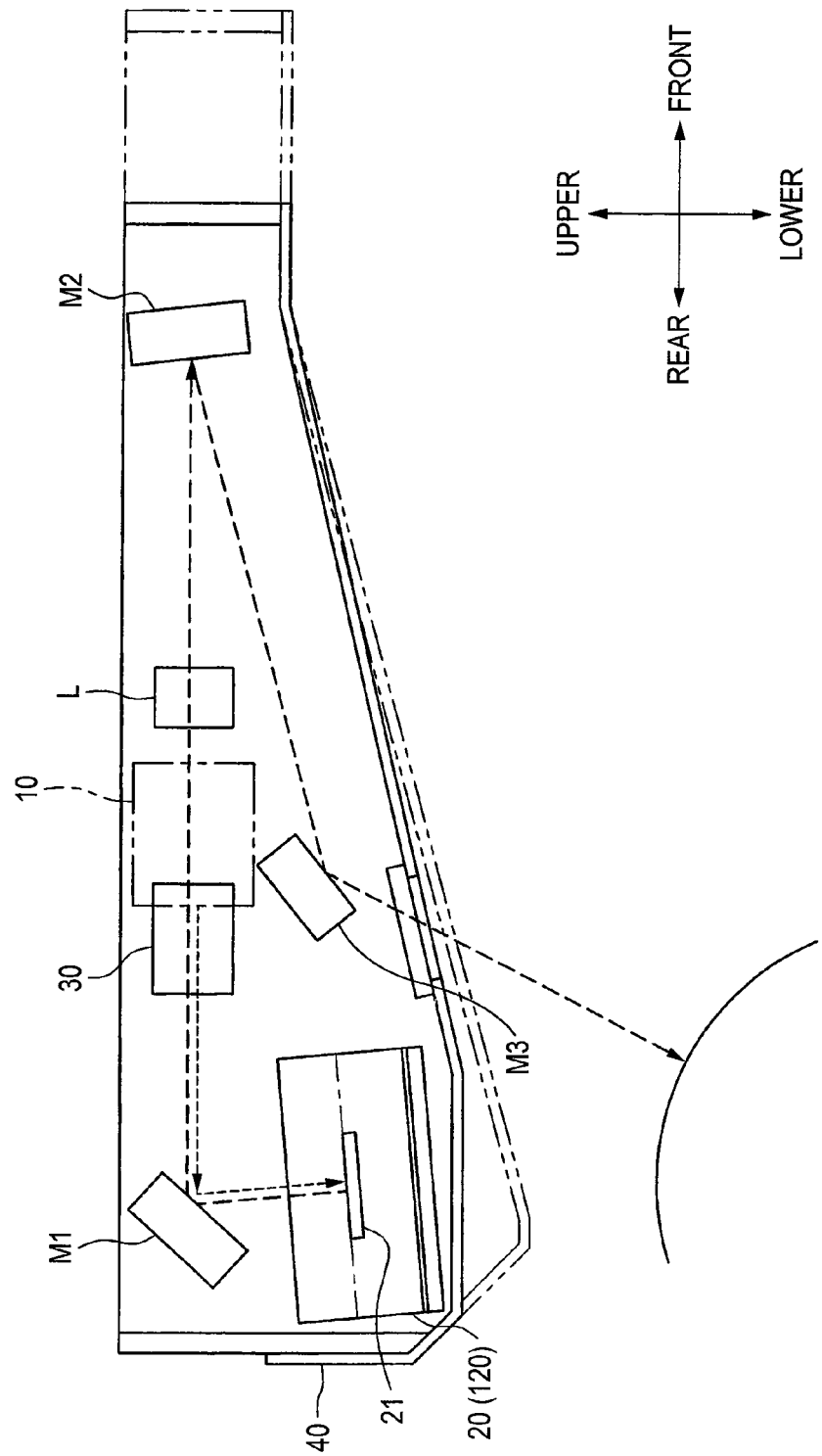

LIGHT SCANNING DEVICE

CROSS-REFERENCE TO RELATED APPLICATION

This application claims priority from Japanese Patent Application No. 2007-018278, filed on Jan. 29, 2007 and Japanese Patent Application No. 2007-143200, filed on May 30, 2007, the entire subject matter of which is incorporated herein by reference.

TECHNICAL FIELD

Aspects of the present invention relate to a light scanning device including a MEMS mirror.

BACKGROUND

Generally, an image forming apparatus includes a light scanning device which scans a charged photoconductor drum with light beam to form an electrostatic latent image thereon. The electrostatic latent image is supplied with a developer to form a developer image which is transferred on a sheet, thereby forming an image on the sheet.

JP-A-2004-198500 discloses a light scanning device installed in the image forming apparatus in which a MEMS (Micro Electro Mechanical System) mirror which oscillates rotationally is used to make scanning.

SUMMARY

The MEMS mirror is small and difficult to handle. For example, it is often very difficult to directly mount the MEMS mirror on a frame formed with a plurality of ribs. Also, since the MEMS mirror oscillates rotationally at high frequency, the oscillation may cause noise through peripheral components.

Aspects of the present invention relate to the above problem. According to at least one aspect of the present invention, a light scanning device may be provided in which a mounting operation of the MEMS mirror on a frame can be easily performed.

According to an aspect of the present invention, a light scanning device includes: a light source which emits light; a frame which supports the light source; an oscillating mirror which rotationally oscillates about a first axis to reflect the light emitted from the light source; a mirror holder which holds the oscillating mirror; a beam member which extends in a first direction orthogonal to the first axis and which is longer than the mirror holder in the first direction; a first fixing member which fixes the mirror holder to the beam member; and a second fixing member which fixes the beam member to the frame.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 14 is a side view showing a form in which an oscillating mirror is oriented upward;

DETAILED DESCRIPTION

First Exemplary Embodiment

Figure 1:
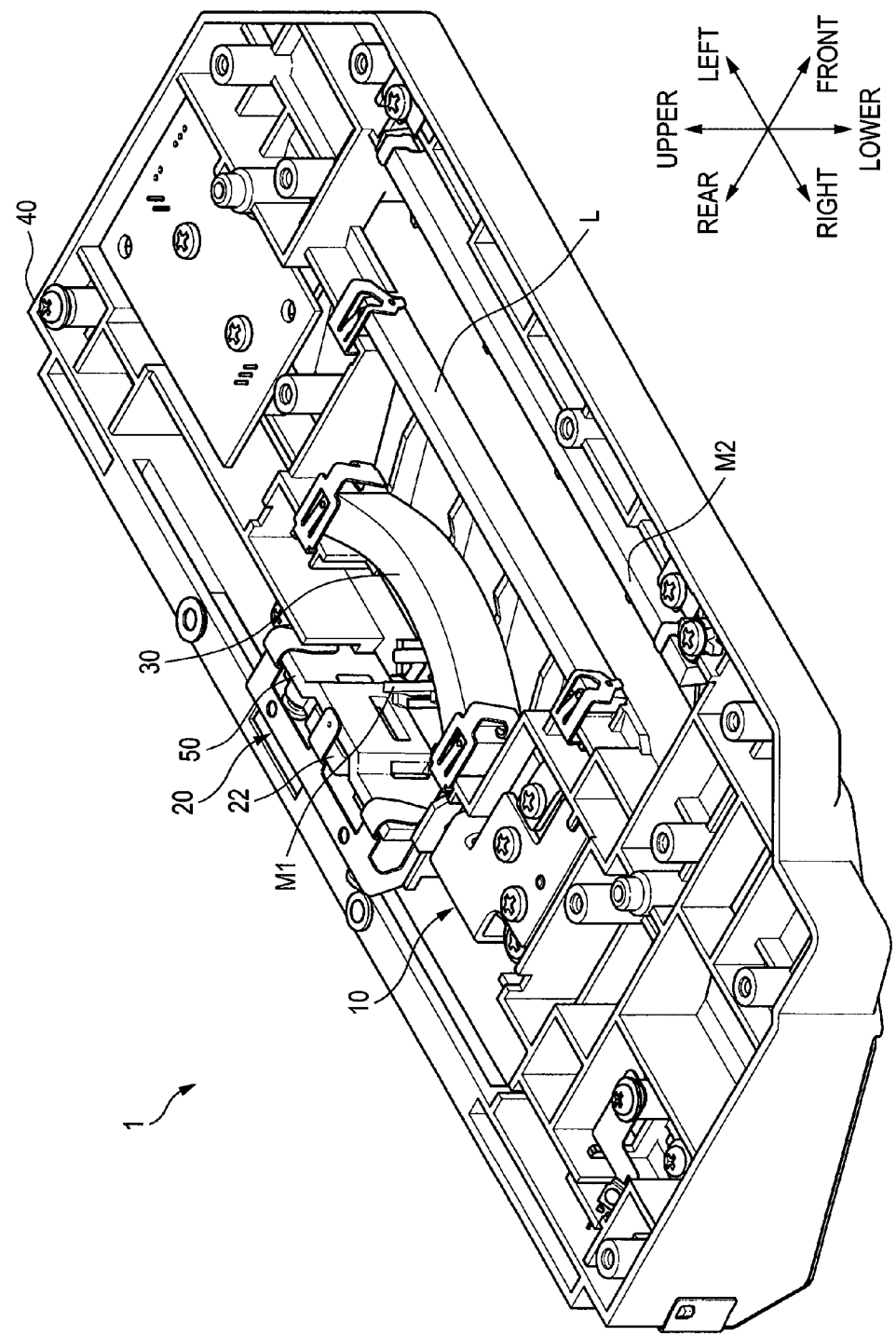
FIG. 1 is a perspective view showing a light scanning device according to a first exemplary embodiment of the present invention.
Figure 2:
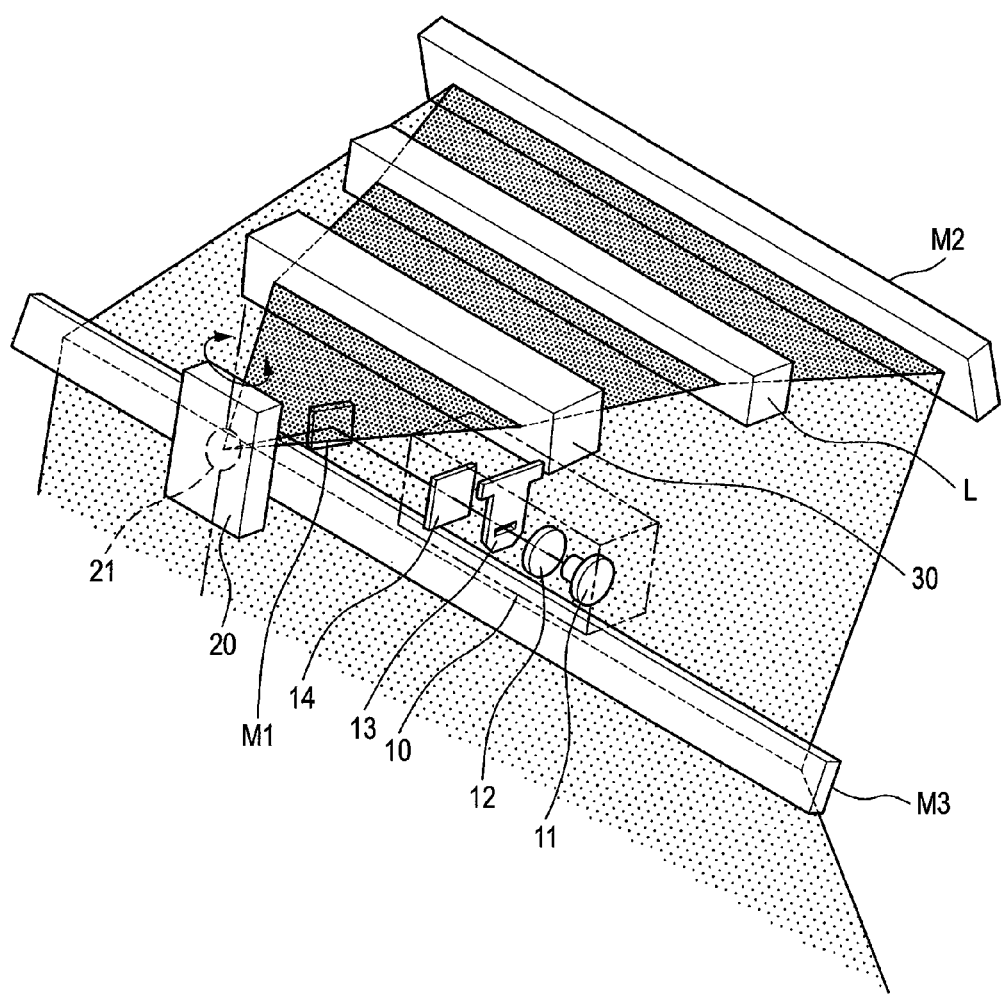
FIG. 2 is a schematic view showing the components of the light scanning device and a light path.

A first exemplary embodiment of the present invention will be described below in detail with reference to the drawings. In the drawings, FIG. 1 is a perspective view showing a light scanning device according to the first exemplary embodiment of the present invention. FIG. 2 is a schematic view showing the components of the light scanning device and light path. Firstly, referring to FIGS. 1 and 2, the overall configuration of the light scanning device will be briefly described below.

[Light Scanning Device 1]

As shown in FIG. 1, the light scanning device 1 mainly comprises a light source unit 10, a first mirror M1, an oscillating mirror unit 20, a first scanning lens 30 as a scanning optics lens, a second scanning lens L, a second mirror M2, a frame 40 which supports them, and a third mirror M3 (see FIG. 2) disposed under the frame 40.

[Light Source Unit 10]

As shown in FIG. 2, the light source unit 10 comprises a laser diode 11, a coupling lens 12, a diaphragm member 13, and a cylindrical lens 14. And a laser beam emitted from the laser diode 11 passes through the coupling lens 12, the diaphragm member 13 and the cylindrical lens 14, and then is reflected from the first mirror M1 to be directed to the oscillating mirror unit 20.

[Oscillating Mirror Unit 20]

The oscillating mirror unit 20 comprises an oscillating mirror 21 therein which oscillates rotationally in a predetermined range, for changing the reflection direction of the light reflected from the first mirror M1 to make the scanning. And the light reflected from this oscillating mirror 21 passes through the first scanning lens 30 and the second scanning lens L, and then is reflected from the second mirror M2 and the third mirror M3 to be output from the light scanning device 1. The light output from the light scanning device 1 is projected onto a photoconductor (photoconductor drum etc.) installed in an image forming apparatus such as a copier or a laser printer, contributing to the formation of an electrostatic latent image on the photoconductor.

Figure 3:
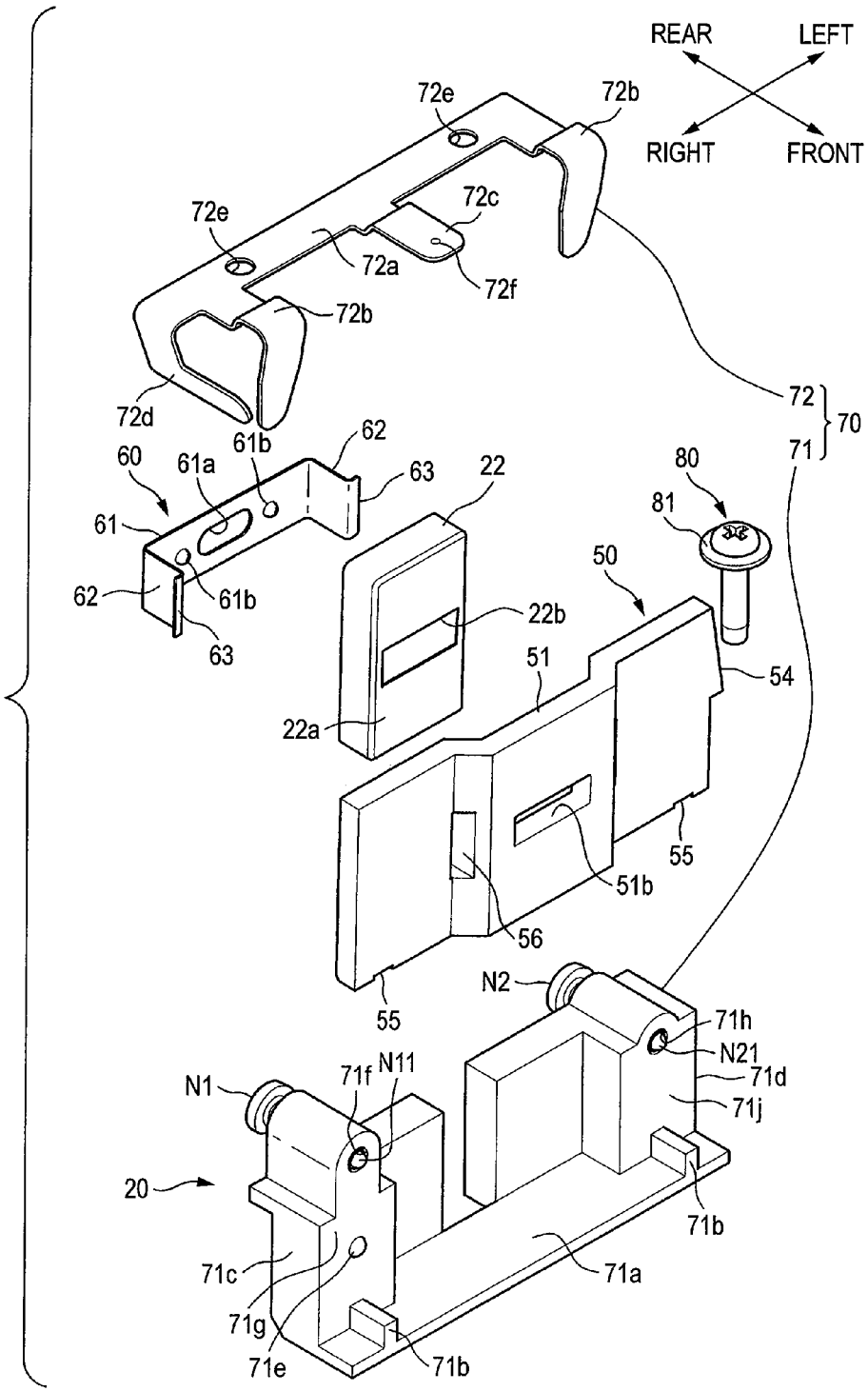
FIG. 3 is an exploded perspective view showing an oscillating mirror unit.
Figure 4:
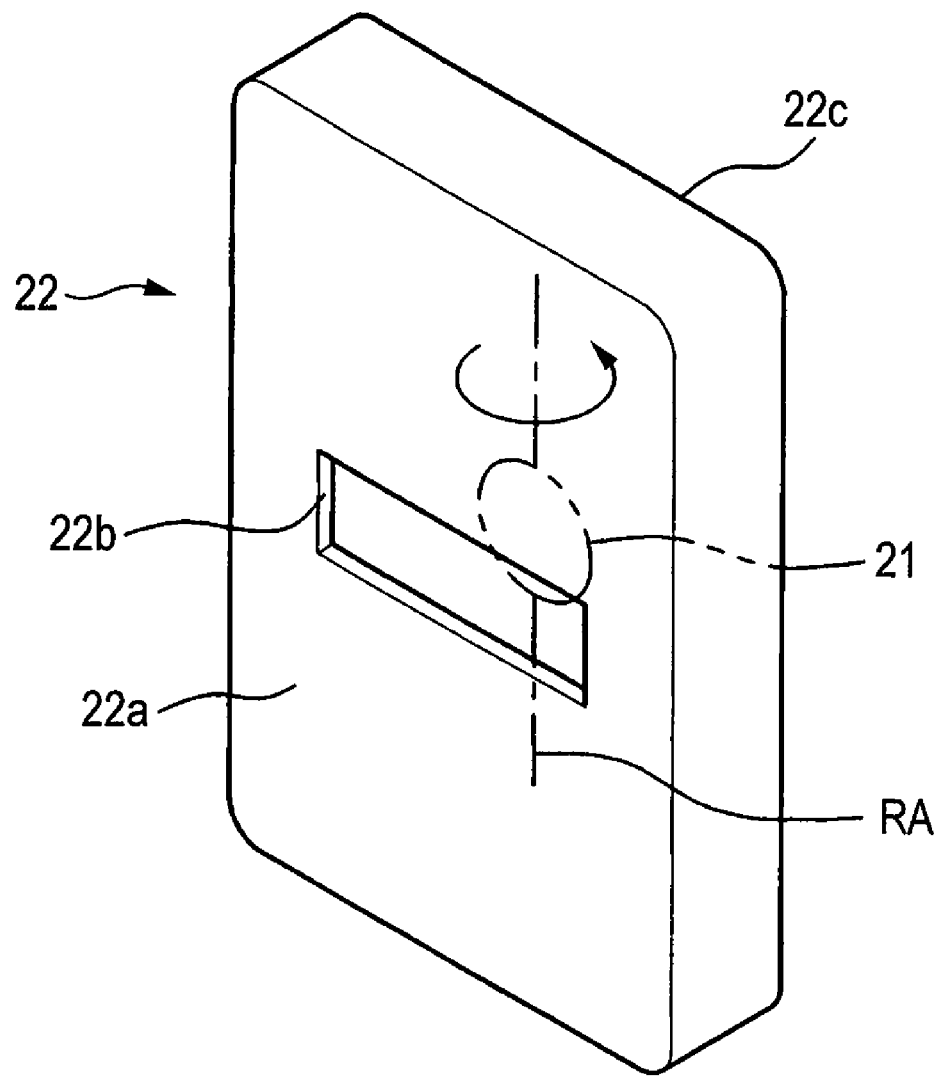
FIG. 4 is an enlarged perspective view showing a mirror package.
Figure 5A:
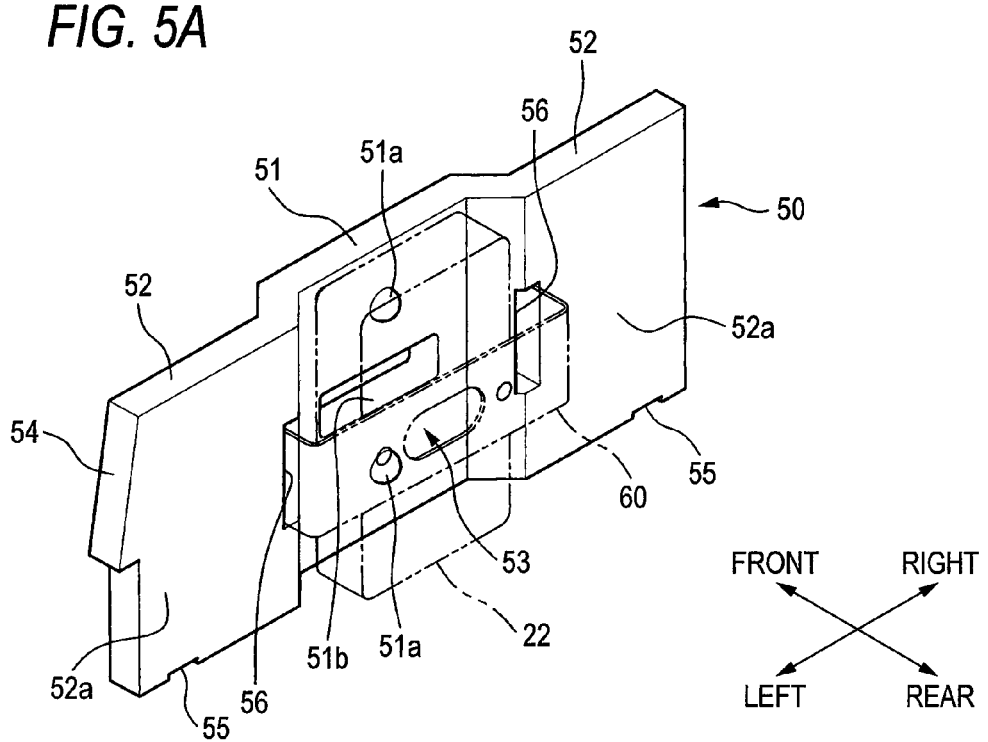
FIG. 5A is an enlarged perspective view showing a beam member as seen from the rear side.
Figure 5B:
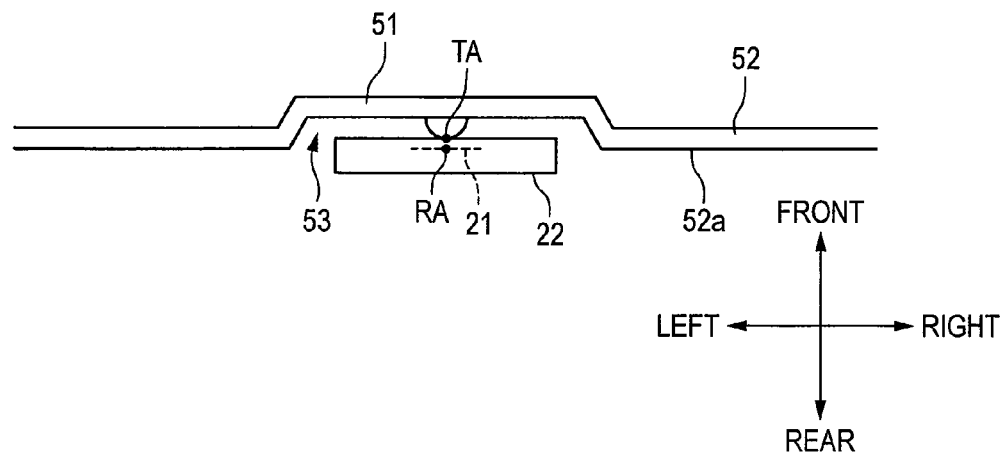
FIG. 5B is an upper view.
Figure 6A:
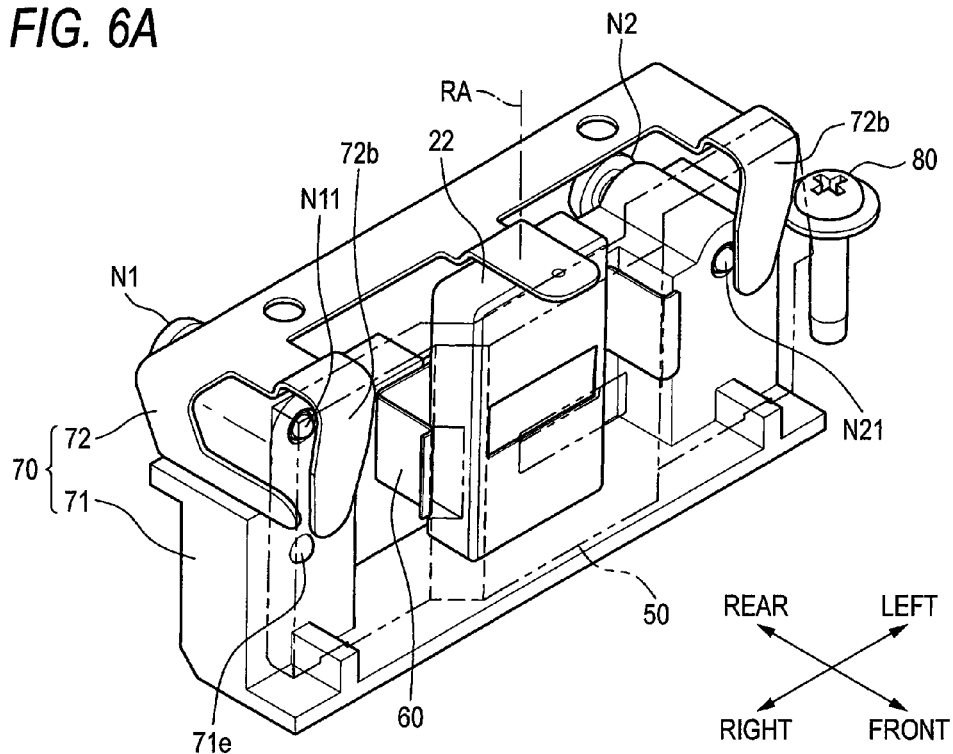
FIG. 6A is a perspective view showing the assembled oscillating mirror unit as seen from the front side.
Figure 6B:
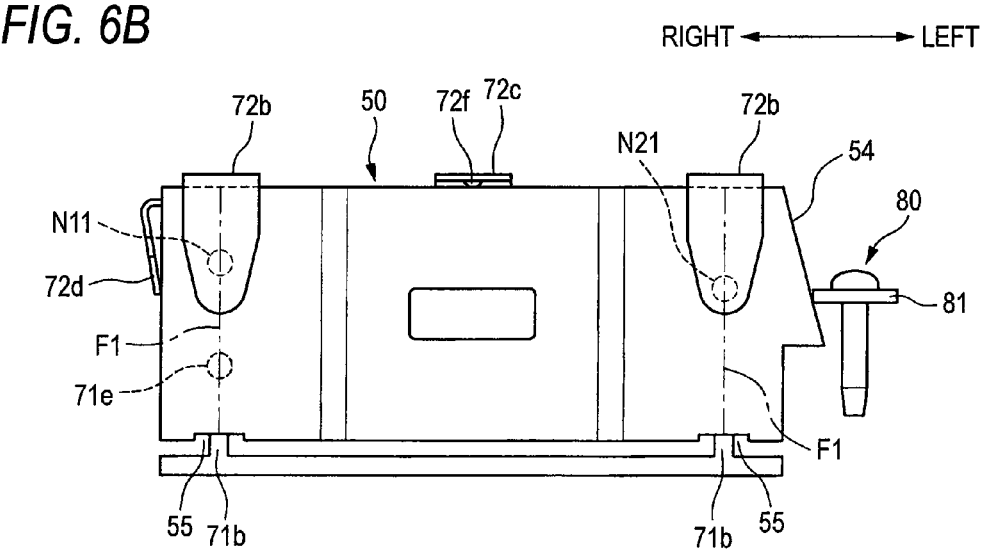
FIG. 6B is a front view.
Figure 7A:
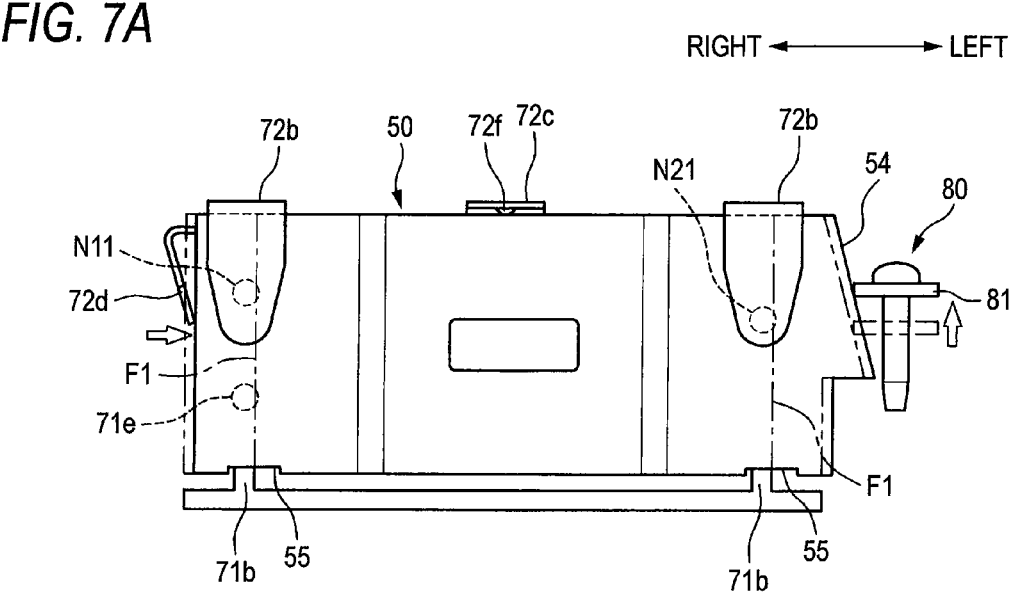
FIG. 7A is a front view showing the motion of a beam member in loosening an adjusting screw.
Figure 7B:
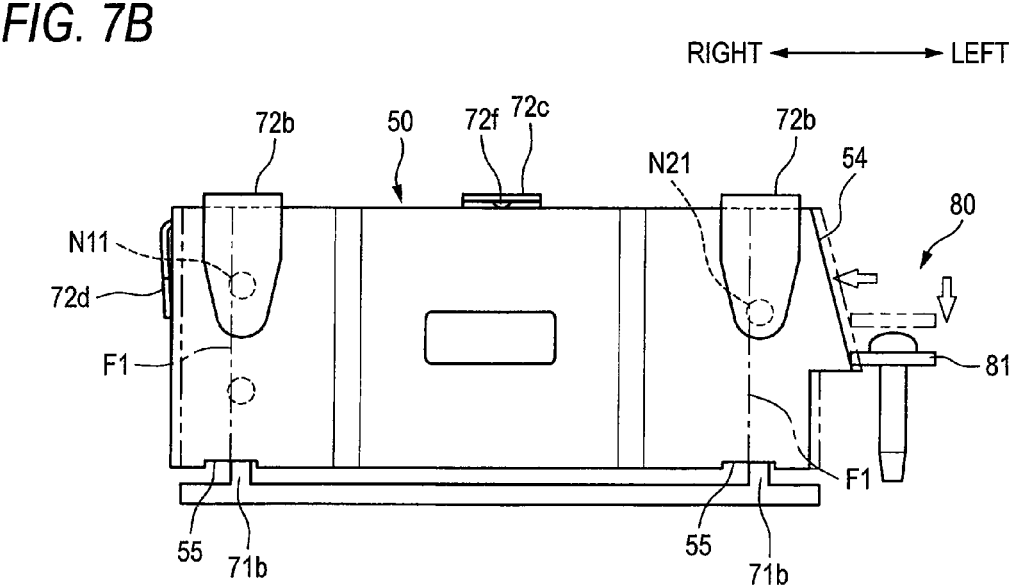
FIG. 7B is a front view showing the motion of the beam member in tightening the adjusting screw.

The details of the oscillating mirror unit 20 will be described below. In the drawings for reference, FIG. 3 is an exploded perspective view showing an oscillating mirror unit. FIG. 4 is an enlarged perspective view showing a mirror package. FIG. 5A is an enlarged perspective view showing a beam member as seen from the rear side, and FIG. 5B is an upper view. FIG. 6A is a perspective view showing the assembled oscillating mirror unit as seen from the front side, and FIG. 6B is a front view, FIG. 7A is a front view showing the motion of a beam member in loosening an adjusting screw and FIG. 7B is a front view showing the motion of the beam member in tightening the adjusting screw. In the following explanation, the longitudinal (front-rear direction), lateral (right-left direction) and vertical (upper-lower direction) directions are taken with reference to the direction as shown in FIG. 1.

As shown in FIG. 3, the oscillating mirror unit 20 mainly comprises a mirror package 22 as one example of an mirror holder, a long beam member 50, a first fixing member 60 which fixes the mirror package 22 to the beam member 50, a second fixing member 70 which fixes the beam member 50 to the frame 40, and an adjusting screw 80 as one example of an adjustment member.

As shown in FIG. 4, the mirror package 22 is formed in a rectangular case including a hollow and holds the oscillating mirror 21 therein. Specifically, the oscillating mirror 21 is formed integrally via a shank portion with a plate-like support body (not shown) having opening larger than the oscillating mirror 21 to constitute an MESS mirror. And the support body of this MEMS mirror is fixed to the mirror package 22 so that the oscillating mirror 21 can be freely oscillated with respect to the mirror package 22.

The mirror package 22 is formed with an opening portion 22b in a front wall 22a, which exposes the oscillating mirror 21.

As shown in FIG. 3, the beam member 50 is a long member extending in a direction orthogonal to the rotational oscillation axis RA (see FIG. 4) of the oscillating mirror 21 and longer than the mirror package 22. The vertical length of the beam member 50 and that of the mirror package 22 (length in the direction of the rotational oscillation axis RA) are almost equal. As shown in FIG. 5A, one pair of supporting projections 51a which supports the mirror package 22 are arranged vertically in the central portion 51 of the beam member 50.

An opening portion 51b corresponding to the opening portion 22b of the mirror package 22 is formed between the pair of supporting projections 51a. Thereby, the light incident from the front side of the beam member 50 passes through the opening portion 51b to be projected onto the oscillating mirror 21 in the mirror package 22, and the light reflected from the oscillating mirror 21 passes through the opening portion 51b to be output forward from the beam member 50.

The central portion 51 of the beam member 50 is formed to protrude forward from a supported part 52 on either side thereof, whereby a concave portion 53 is formed on the rear side of the beam member 50. As shown in FIG. 5B, the depth of the concave portion 53 is formed such that the rotational oscillation axis RA of the oscillating mirror 21 is located on the plane of the rear face 52a of the supported part 52. In other words, the depth of the concave portion 53 is set such that the rotational oscillation axis RA of the oscillating mirror 21 is positioned on the plane defined with a top end N11 of a first screw N1, a spherical projection 71e and a top end N21 of a second screw N2 (see FIG. 6), as will be described later. According to this configuration, a tilting angle of the oscillating mirror 21 can be adjusted easily.

The beam member 50 includes an inclined face 54 as one example of a pressed face at the left edge (end portion) thereof. The inclined face 54 is contact with an adjusting screw 80 and inclined with respect to the direction along which the adjusting screw 80 is moved back or forth. Specifically, this inclined face 54 is inclined downward in the left direction, whereby if the adjusting screw 80 is tightened downward, this adjusting screw 80 presses the beam member 50 via the inclined face 54 in the right direction.

Further, the beam member 50 includes an engagement groove 55 at the lower end of each supported part 52 of the beam member 50. The beam member 50 is provided to be engaged with a support piece 71b (see FIG. 3) of a support block 71. This engagement groove 55 is formed in a larger width than the support piece 71b of the support block 71, whereby the beam member 50 is movable in the lateral direction (main scanning direction) within the width range of the engagement groove 55. Further, the beam member 50 includes an engagement hole 56 on the inner edge side of each supported part 52. Into the engagement hole 56, an arm part 62 of the first fixing member 60 is inserted and the engagement hole 56 is engaged with an engagement pawl part 63.

As shown in FIG. 3, the first fixing member 60 fixes the mirror package 22 to the beam member 50 and is formed by properly bending an elastically deformable plate. Specifically, the first fixing member 60 comprises a support wall part 61 which supports the rear face of the mirror package 22, one pair of arm parts 62 bent forward from both the left and right ends of the support wall part 61, and the engagement pawl part 63 bent outside in the lateral direction from the front end of each arm part 62. The support wall part 61 has a long hole 61a extending in the lateral direction that is formed in its central part, and a pair of convex portions 61b projecting forward that are formed on both the left and right sides of this long hole 61a.

Herein, though the long hole 61a is not used in the first exemplary embodiment, the long hole can be used as the hole through which the light incident on the oscillating mirror 21 in the mirror package 22 and the light reflected from the oscillating mirror 21 pass when the mirror package 22 of the first exemplary embodiment is disposed reversely in the longitudinal orientation. The oscillating mirror 21 may be used as a double faced mirror.

The pair of arm parts 61 in the first fixing member 60 configured in this manner are inserted into respective engagement holes 56 of the beam member 50 in a state where the arm parts 61 are slightly bent inward in the lateral direction, and the engagement pawl part 63 is hooked on the front face of the beam member 50, so that the mirror package 22 is fixed to the beam member 50 with the first fixing member 60. Particularly, the mirror package 22 is supported by the pair of convex portion 61b of the first fixing member 60 and the pair of supporting projections 51a (see FIG. 5) of the beam member 50.

The second fixing member 70 comprises a support block 71 which supports the beam member 50 mainly from the lower side, and a leaf spring 72 which holds the beam member 50 with the support block 71 between them.

The support block 71 comprises a basal part 71a formed along the bottom wall of the frame 40 (see FIG. 1), one pair of support pieces 71b, 71b which supports the lower end of the beam member 50, and one pair of support posts 71c, 71d which supports the rear face of the beam member 50. Though in the first exemplary embodiment, the support block 71 is formed separately from the frame 40, the invention is not limited thereto, but the support block 71 may be formed integrally with the frame 40. In this case, however, the second fixing member 70 which fixes the beam member 50 to the frame 40 is composed of only the leaf spring 72. On the contrary, in the case where the second fixing member 70 is composed of the support block 71 and the leaf spring 72 as in the first exemplary embodiment, the beam member 50 is fixed via the support block 71 to the frame 40.

The basal part 71a is formed like a rectangular plate extending along the lateral direction. The support piece 71h is formed to project upward from the basal part 71a at front side of respective ends. As shown in FIG. 6B, an interval (pitch) between the support pieces 71b in the central portion is set to be equal to an interval of nodes F1 of the primary natural oscillation of the beam member 50.

As shown in FIG. 3, the support posts 71c, 71d are formed on the rear side of the support pieces 71b, 71b and formed higher than the support pieces 71b, 71b. The right support post 71c is formed with a spherical projection 71e as one example of the first projection projecting forward and a through hole 71f formed to penetrate in the longitudinal direction at the position shifted vertically (in the direction of the rotational oscillation axis RA; see FIG. 4) from the spherical projection 71e. A first screw N1 is screwed from the rear side into the through hole 71f to be freely movable back and forth. As the top end N11 of the first screw N1 projects forward from the front face 71g of the support post 71c to be freely movable back and forth, the top end N11 functions as one example of the second projection. As shown in FIG. 63, the top end N11 of the first screw N1 projecting forward in this manner and the spherical projection 71e are arranged in line with the right support piece 71b vertically.

The left support post 71d is formed with a through hole 71h penetrating in the longitudinal direction. A second screw N2 is screwed from the rear side into this through hole 71h to be freely movable back and forth. When the top end N21 of the second screw N2 projects forward from the front face 71j of the support post 71d to be freely movable back and forth, the top end N21 functions as one example of the third projection. As shown in FIG. 6B, the top end N21 of the second screw N2 projecting forward in this manner is disposed in line with the left support piece 71b vertically.

And the beam member 50 is supported at three points, that is, the spherical projection 71e, the top end N11 of the first screw N1 and the top end N21 of the second screw N2. By properly turning the first screw N1 or the second screw N2 to properly move back and forth the top end N11 or N12, the tilting angle of the beam member 50 supported at the three points can be adjusted and further the tilting angle (reflection angle) of the oscillating mirror 21 can be adjusted. In detail, by properly turning the first screw, the beam member 50 and the oscillating mirror 21 are rotationally tilted around a line connecting the spherical projection 71e and the top end N21 of the second screw N2.

The leaf spring 72 comprises a basal part 72a, a front and rear presser part 72b as one example of the second elastic member, an upper and lower presser part 72c, and a position adjusting spring part 72d as one example of the first elastic member. The basal part 72a is formed in a rectangular plate extending in the lateral direction and is formed, at an appropriate position, with a mounting hole 72e which secures the leaf spring 72 to the support block 71 or frame 40 at the appropriate position.

The pair of front and rear presser parts 72b is formed on both ends of the basal part 72a to extend forward from the front end of the basal part 72a and then be bent upward, forward and downward in succession so that the top end is elastically deformable in the longitudinal direction. As shown in FIG. 6A, the right front and rear presser part 72b sandwiches and holds the beam member 50 with the spherical projection 71e and the top end N11 of the first screw N1 between them. The left front and rear presser part 72b holds the beam member 50 with the top end N21 of the second screw N2.

The upper and lower presser part 72c is formed near the center of the basal part 72a to extend forward from the front end of the basal part 72a, and then be bent upward and forward in succession so that the top end is elastically deformable in the vertical direction. A convex portion 72f projecting downward is formed at the front end part of the upper and lower presser part 72c. As shown in FIG. 6A, the upper and lower presser part 72c with the convex portion 72f securely presses the beam member 50 against the pair of support pieces 71b, 71b, further against the frame 40 via the support pieces 71h, 71b.

The position adjusting spring part 72d is formed at the right end of the basal part 72a to extend from the right end and be bent left downward and forward, thereby always pressing (urging) the beam member 50 leftward.

The second fixing member 70 configured above fixes the beam member 50 against the frame 40 via the support block 71 in a state where it is movable in the lateral direction (main scanning direction). Two positions becoming the node (see FIG. 6B) of the primary natural oscillation in the beam member 50 are fixed via the support block 71 to the frame 40 with the pair of front and rear presser parts 72b, 72b of the second fixing member 70. It is noted that the positions becoming the node of the primary natural oscillation are determined by a frequency of the oscillating mirror 21 and characteristics of the beam member 50 and so on.

The adjusting screw 80 is screwed into a screw-hole (not shown) formed at an appropriate position of the support block 71 or the frame 40 to be movable back or forth in a different direction from the main scanning direction (longitudinal direction) of the beam member 50, or in a vertical direction (direction of the rotational oscillation axis RA) in the first exemplary embodiment. The adjusting screw 81 includes a collar part 81 which makes contact with the inclined face 54 of the beam member 50 in a state where the adjusting screw 81 is screwed into the support block 71 or the like. Therefore, if the adjusting screw 80 is loosened from the state as shown in FIG. 6B and moved upward, the beam member 50 supported by the collar part 81 or the adjusting screw 80 is gradually released, and therefore, the beam member 50 is moved leftward due to a restoring force of the position adjusting spring part 72d, as shown in FIG. 7A. Conversely, if the adjusting screw 80 is tightened from the state as shown in FIG. 6B and moved downward, the beam member 50 is pressed and moved rightward by the collar part 81 of the adjusting screw 80 against an urging (pressing) force of the position adjusting spring part 72*d*, as shown in FIG. 7B. With the above, the position of the beam member 50 in the main scanning direction (longitudinal direction) can be adjusted by the adjusting screw 80 and the position adjusting spring part 72*d*.

A method for mounting the oscillating mirror 21 on the frame 40 will be described below. Firstly, the oscillating mirror 21 is fixed in the mirror package 22, as shown in FIG. 4. Subsequently, this mirror package 22 is set in the concave portion 53 of the beam member 50 as shown in FIG. 5A, and then fixed on the beam member 50 by the first fixing member 60.

After the support block 71 is fixed to the frame 40, the beam member 50 is set on the support piece 71*b* of the support block 71, as shown in FIG. 3. Thereafter, the second fixing member 70 is fixed to the support block 71 or the frame 40, whereby the beam member 50 is fixed to the support block 71 by the second fixing member 70.

The position of the beam member 50 in the main scanning direction is adjusted by screwing the adjusting screw 80 into the frame 40 or the like, as shown in FIGS. 7A and 7B, so that the nodes F1 of the primary natural oscillation of the beam member 50 are aligned with the top end N11 of the first screw N1, the spherical projection 71*e* and the top end N21 of the second screw N2, as shown in FIG. 6B. It may be advantageous that the nodes F1, F1 are marked beforehand with paint or notch.

Thereafter, the tilting angle of the beam member 50 and the tilting angle of the oscillating mirror 21 are adjusted by properly adjusting the first screw N1 or the second screw N2, as shown in FIG. 6A. In the above manner, the oscillating mirror 21 is mounted at the proper position and angle on the frame 40.

According to the above configuration, the first exemplary embodiment may have the following effects.

Since the oscillating mirror 21 is mounted via the mirror package 22 on the beam member 50 which is larger and easier to handle than the oscillating mirror 21, the mounting operation of the oscillating mirror 21 on the frame 40 may be facilitated. Also, the position and angle of the oscillating mirror 21 can be adjusted by moving the beam member 50 which is easier to handle, whereby the adjustment operation is also facilitated.

Since the beam member 50 can be freely moved in the main scanning direction by the adjusting screw 80 and the position adjusting spring part 72*d*, the position adjustment of the oscillating mirror 21 in the main scanning direction can be easily performed.

Since the direction of moving back and forth the adjusting screw 80 is the direction along the rotational oscillation axis RA of the oscillating mirror 21, a tool such as a driver for operating the adjusting screw 80 can be inserted into the frame 40 from the direction orthogonal to the bottom face of the frame 40, in the case where the beam member 50 is disposed so that the rotational oscillation axis AR may be orthogonal to the bottom face of the frame 40 as in the first exemplary embodiment. Therefore, the adjusting screw 80 can be easily adjusted without contact of the tool or the hand having the tool with the frame 40.

Since the nodes F1, F1 of the primary natural oscillation in the beam member 50 are fixed to the frame 40 (particularly, the support block 71 fixed to the frame 40) by the second fixing member 70, the noise occurring from the beam member 50 oscillating due to the rotational oscillation of the oscillating mirror 21 can be suppressed.

Since the second fixing member 70 comprises the leaf spring 72, the position adjustment of the beam member 50 can be easily performed.

Since two of the projections supporting the beam member 50 at three points, that is, the top end N11 of the first screw N1 and the top end N21 of the second screw N2 are freely movable back and forth, the tilting angle of the beam member 50 (oscillating mirror 21) can be simply adjusted by turning the first screw N1 or the second screw N2.

Since the beam member 50 is pressed against the vertical movement by the upper and low presser part 72*c*, the vertical position of the oscillating mirror 21 can be stabilized.

Since the rotational oscillation axis RA of the oscillating mirror 21 is arranged on the plane of the rear face 52*a* of the beam member 50 owing to the concave portion 53 formed in the beam member 50, the tilting angle of the oscillating mirror 21 is also adjusted at the same angle as this rear face 52*a*, if the tilting angle of the rear face 52*a* of the beam member 50 is adjusted by operating the first screw N1 or second screw N2. That is, in the case where the position of the rotational oscillation axis RA is located away from the plane of the rear face 52*a*, there is an error in the angle difference of the rear face 52*a* before and after adjustment and the angle difference of the oscillating mirror 21 before and after adjustment, although this problem can be resolved by locating the rotational oscillation axis RA on the plane of the rear face 52*a*.

The present invention is not limited to the above first exemplary embodiment, for example, the following embodiments may also fall within the technical scope of the present invention.

Though in the above embodiment, the position adjusting spring part 72*d* and the front and rear presser part 72*b* are like the leaf spring as the first elastic member and the second elastic member, the invention is not limited thereto, but a coil spring may be employed.

Figure 8:
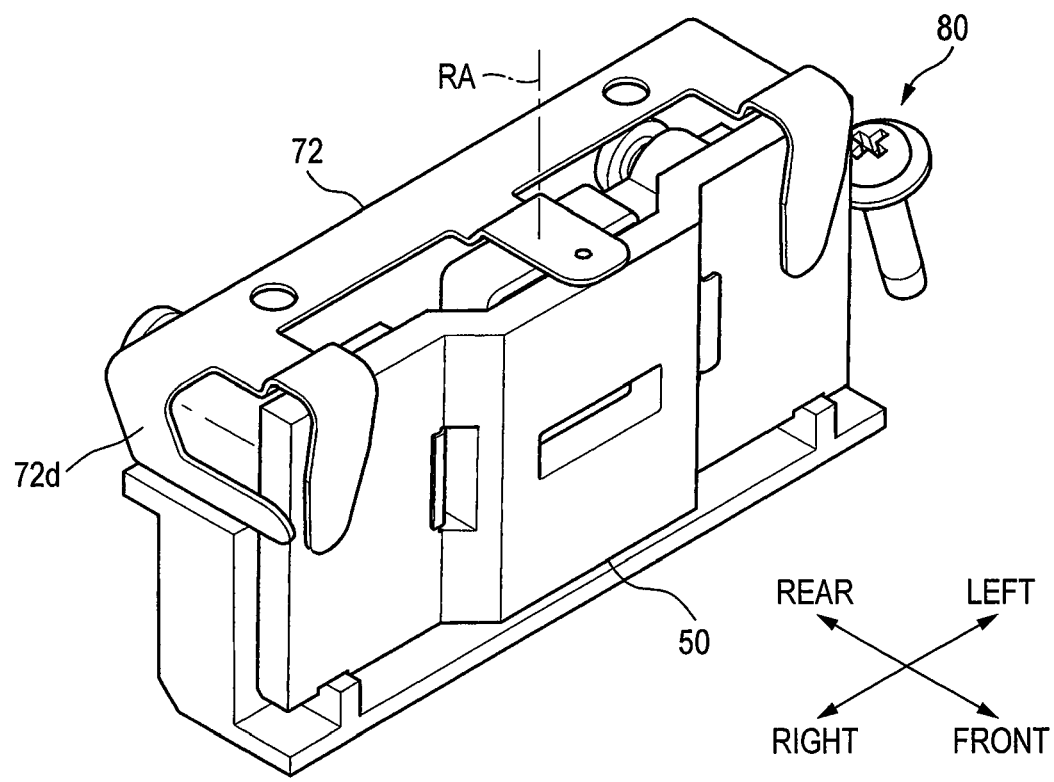
FIG. 8 is a perspective view showing a configuration in which the direction for moving the adjusting screw back and forth is slanted with respect to the rotational oscillation axis.

Though in the above embodiment, the direction of moving back and forth the adjusting member 80 is the direction along the rotational oscillation axis RA of the oscillating mirror 21, and the pressed face of the beam member 50 contact with this adjusting screw 80 is the inclined face 54 inclined with respect to the rotational oscillation axis RA, the invention is not limited thereto, but the pressed face may be inclined with respect to the direction of moving back and forth the adjusting member. For example, as shown in FIG. 8, the direction of moving back and forth the adjusting member 80 may be the direction inclined from the rotational oscillation axis RA and the left end face of the beam member 80 may be formed in parallel to the rotational oscillation axis RA (vertical direction) In this case, the beam member 50 can be also positioned in the main scanning direction by the adjusting screw 80 and the position adjusting spring part 72*d*. Additionally, since both ends of the beam member 50 can be aligned in parallel in this structure, the yield of material in preparing the material for a plurality of beam members 50 by cutting the long plate can be improved.

Figure 9:
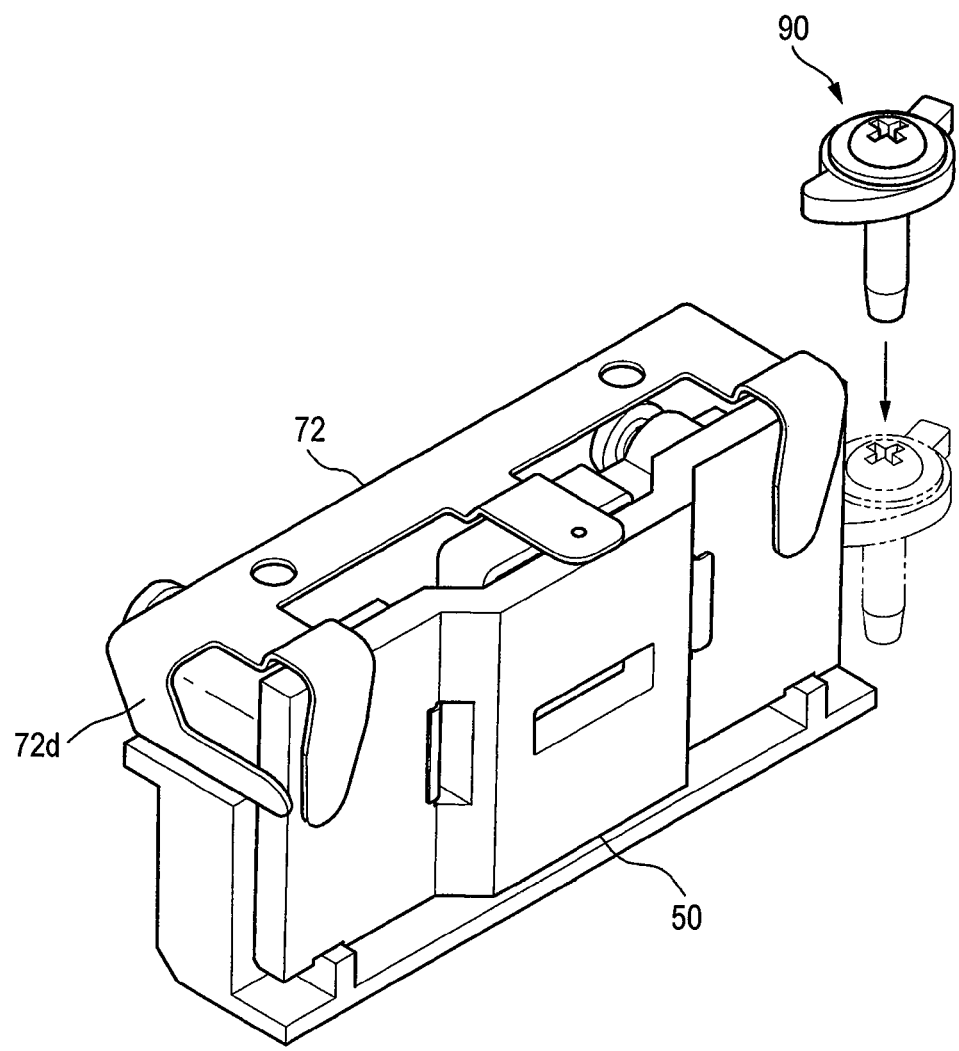
FIG. 9 is a perspective view showing a configuration in which an eccentric cam is employed as an adjustment member.

Though in the above embodiment the adjusting screw 80 is employed as the adjustment member, the invention is not limited thereto, but an eccentric cam 90 may be employed as shown in FIG. 9. Even in this case, the beam member 50 can be positioned in the main scanning direction by the eccentric cam 90 and the position adjusting spring part 72*d*. Also, since both ends of the beam member 50 can be aligned in parallel in this structure similar to the structure of FIG. 8, the yield of the plate that is raw material for the beam member 50 can be improved.

Though in the above embodiment, the beam member 50 can be moved in the main scanning direction by bringing the adjusting screw 80 into contact with the inclined face 54 inclined in the direction of moving back and forth the adjusting screw 80, the invention is not limited thereto. For example, the screw may be provided to be movable back and forth in the direction orthogonal to the end face along the vertical direction of the beam member 50 as shown in FIG. 8.

Though in the above embodiment, the position adjusting spring part 72d as one example of the first elastic member is formed integrally with the leaf spring 72 making up the second fixing member 70, the invention is not limited thereto, but they may be separately provided.

Though in the above embodiment, the spherical projection 71e that is unmovable back and forth is employed as the first projection, the invention is not limited thereto, but the screw may be movable back and forth.

Second Exemplary Embodiment

Figure 10:
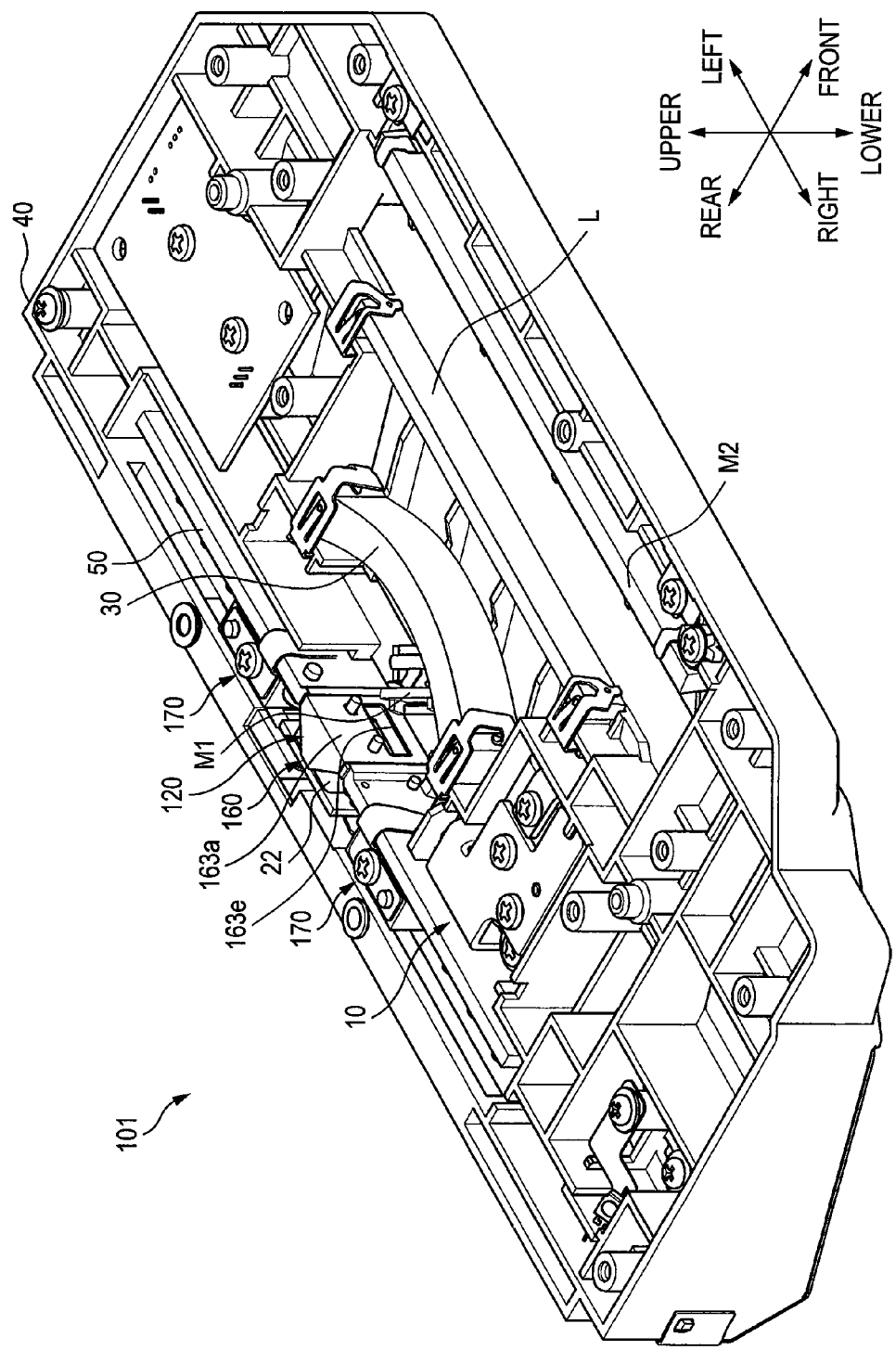
FIG. 10 is a perspective view showing a light scanning device according to a second exemplary embodiment of the present invention.
Figure 11A:
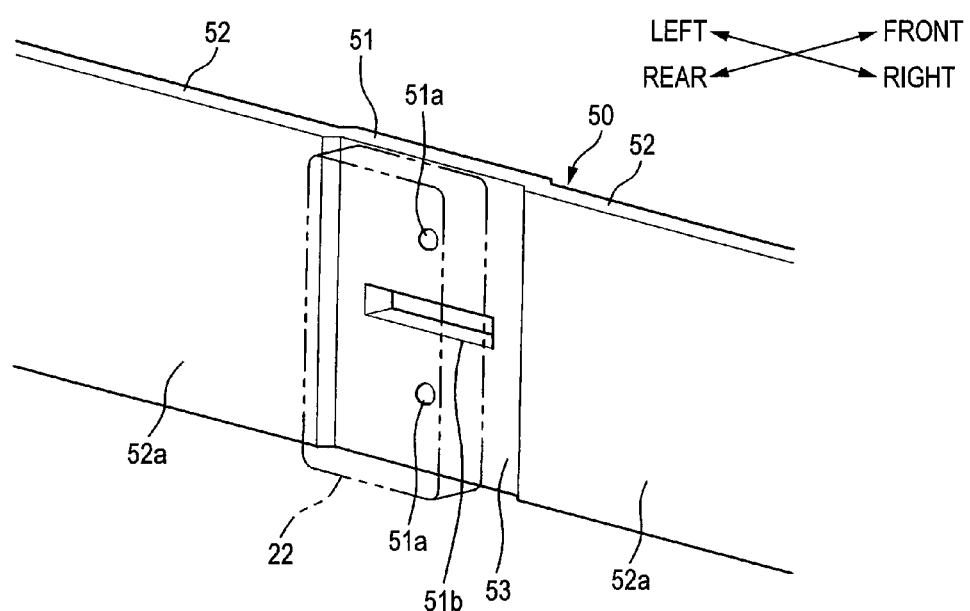
FIG. 11A is an enlarged perspective view showing a beam member and FIG. 11B is an upper view.
Figure 11B:
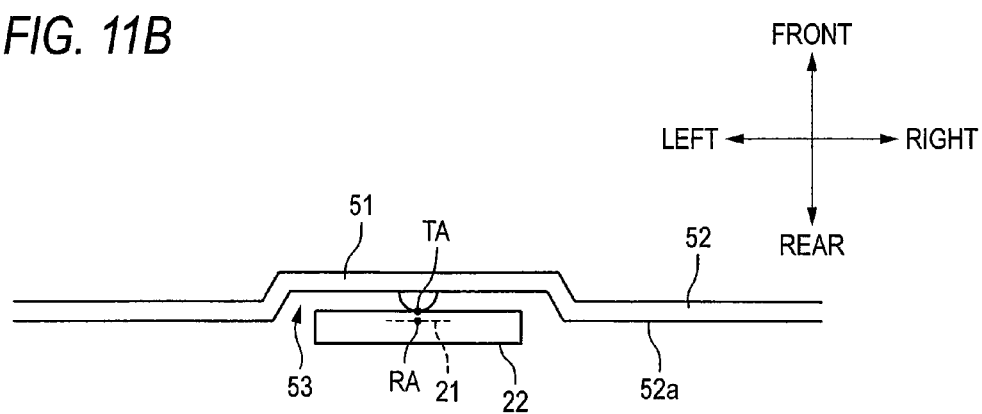
Figure 12A:
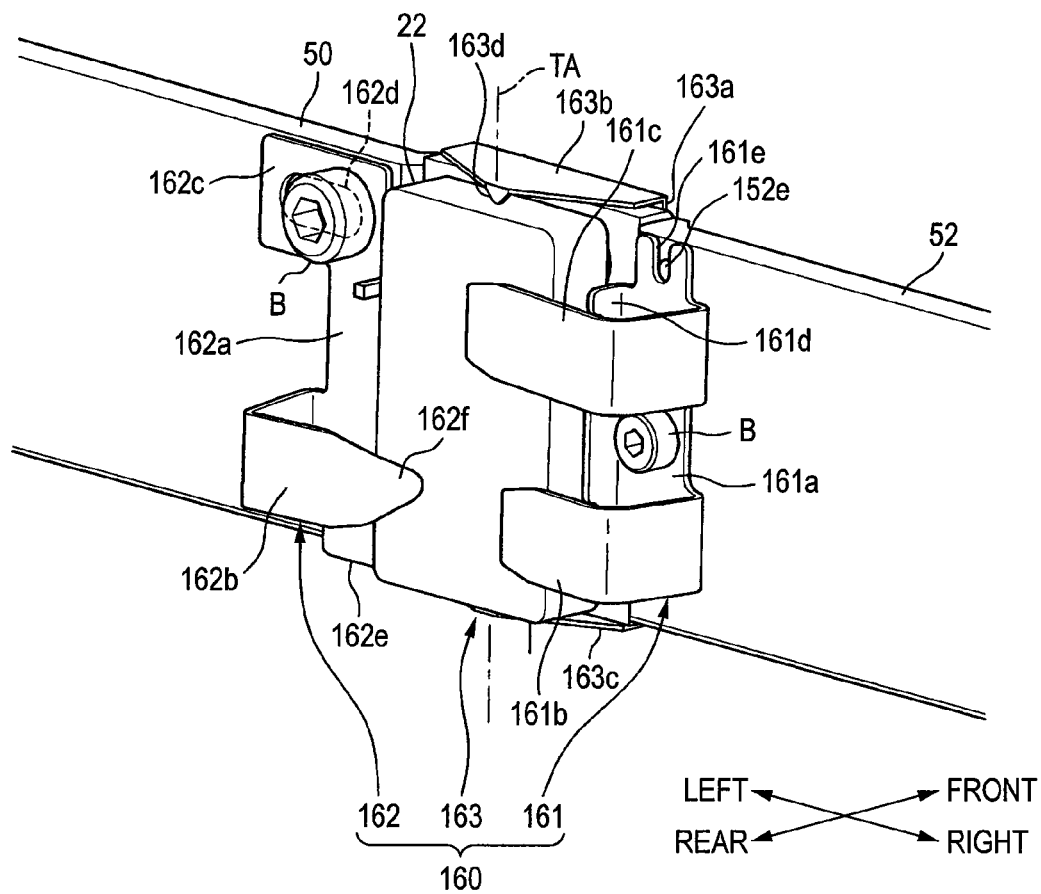
FIG. 12A is an enlarged perspective view showing a first fixing member as seen from the rear side.
Figure 12B:
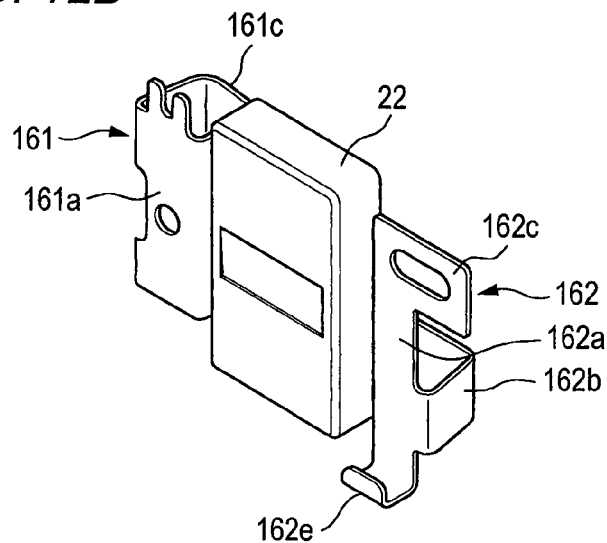
FIG. 12B is an enlarged perspective view showing the first fixing member as seen from the front side.
Figure 13A:
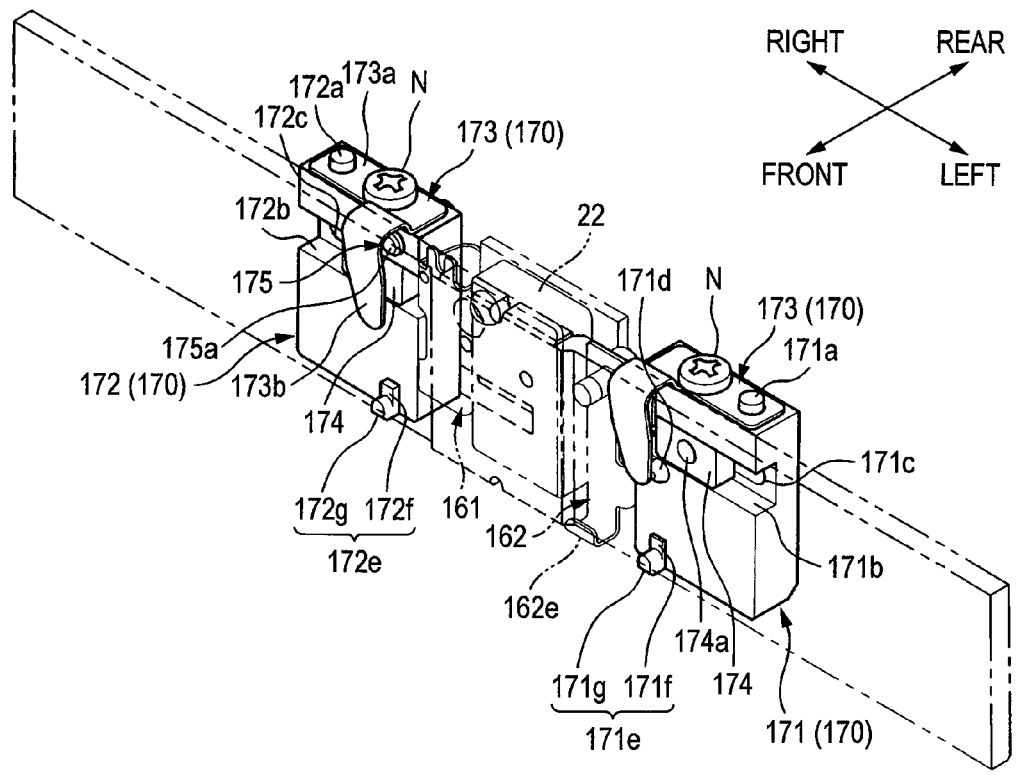
FIG. 13A is an enlarged perspective view showing a second fixing member and FIG. 13B is a front view.
Figure 13B:
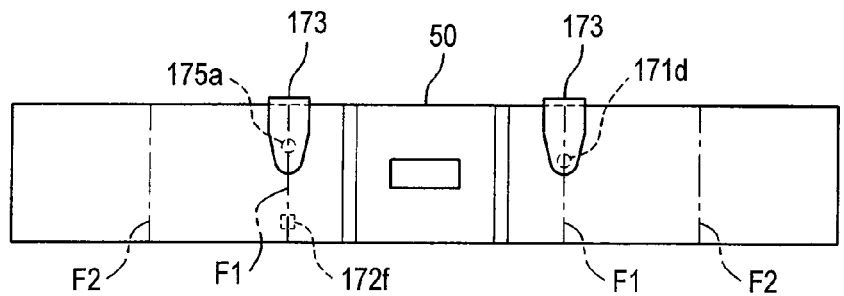

A second exemplary embodiment of the present invention will be described below in detail with reference to the drawings. In this embodiment, since a part of the configuration of the light scanning device 1 according to the first exemplary embodiment is changed, the same reference numeral are attached to the same parts as in the first exemplary embodiment, and the explanation thereof is omitted. In the drawings for reference, FIG. 10 is a perspective view showing a light scanning device according to the second exemplary embodiment of the present invention FIG. 11A is an enlarged perspective view showing a beam member according to the second exemplary embodiment and FIG. 11B is an upper view. Also, FIG. 12A is an enlarged perspective view showing a first fixing member as seen from the rear side, and FIG. 12B is an enlarged perspective view showing the first fixing member as seen from the front side. FIG. 13A is an enlarged perspective view showing a second fixing member according to the second exemplary embodiment and FIG. 13B is a front view. In the following explanation, the longitudinal, lateral and vertical directions are taken with reference to the direction as shown in FIG. 10.

The oscillating mirror unit 120 mainly comprises a mirror package 22 as a mirror holder, a long beam member 50, a first fixing member 160 which fixes the mirror package 22 to the beam member 50, and a second fixing member 170 which fixes the beam member 50 to the frame 40, as shown in FIG. 10.

As shown in FIG. 11A, the beam member 50 is the long member extending in a direction orthogonal to the rotational oscillation axis RA (see FIG. 4) of the oscillating mirror 21 and longer than the mirror package 22. The vertical length of the beam member 50 and that of the mirror package 22 (length in the direction of the rotational oscillation axis RA) are almost equal. As shown in 11A, one pair of tilting projections 51a which supports the mirror package 22 freely tiltably are provided vertically in the central portion 51 of the beam member 50. Thereby, as shown in FIG. 11B, the mirror package 22 can be freely tilted around the tilt axis TA along the rotational oscillation axis RA of the oscillating mirror 21.

An opening portion 51h corresponding to the opening portion 22b of the mirror package 22 is formed between the pair of supporting projections 51a. Thereby, the light incident from the front side of the beam member 50 passes through the opening portion 51b to be projected onto the oscillating mirror 21 in the mirror package 22, and the light reflected from the oscillating mirror 21 passes through the opening portion 51b to be output forward from the beam member 50.

The central portion 51 of the beam member 50 is formed to protrude forward from a supported part 52 on either side thereof, whereby a concave portion 53 is formed on the rear side of the beam member 50. As shown in FIG. 11B, the depth of the concave portion 53 is formed such that the rotational oscillation axis RA of the oscillating mirror 21 is positioned on the plane of the back face 52a of the supported part 52. In other words, the depth of the concave portion 53 is set such that the rotational oscillation axis RA of the oscillating mirror 21 is positioned on the plane defined with a spherical projection 171d of the second fixing member 170 (see Fig. VI), a top end 175a of a screw 175 and a base section 172f, as will be described later.

As shown in FIG. 12A, the first fixing member 160 comprises a right pressing member 161 and a left pressing member 162 as one example of the presser part which presses the mirror package 22 against the beam member 50 to be fixed, and a positioning member 163 which positions the mirror package 22 with respect to the beam member 50.

The right pressing member 161 comprises a basal part 161a fixed on the beam member 50, and a right presser part 161b, a central presser part 161c and a flange 161d which are formed integrally with the basal part 161a.

The basal part 161a is formed with a notch portion 161e at an upper edge portion thereof, and a bolt mounting hole for a bolt B (not shown) in an almost central portion thereof. The notch portion 161e corresponds to a pin properly fitted into a hole 152e formed in the supported part 52 of the beam member 50, whereby the right pressing member 161 is prevented from being turned together with the bolt B in fixing the right pressing member 161 to the beam member 50 with the bolt B.

The right presser part 161b is one example of a first presser part, and formed to extend from a lower part of the right edge of the basal part 161a once backwards and then to the left to be elastically deformable. This right presser part 161b presses the right side of the mirror package 22 with respect to the tilt axis TA by properly setting the length of the leftward extending part and the angle made between the leftward extending part and the backward extending part.

The central presser part 161c is one example of a third presser part, and formed to extend from an upper portion of the right edge of the basal part 161a once backwards and then to the left beyond the right presser part 161b to be elastically deformable. This central presser part 161c presses the center of the back face of the mirror package 22 in the lateral direction by properly setting the length of the leftward extending part and the angle made between the leftward extending part and the backward extending part. In other words, this central presser part 161c contacts the back face of mirror package 22 in a region rear from the tilt axis TA on the front face of the mirror package 22.

The flange 161d stands from the left edge of the basal part 161a backward. Thereby, the strength of the central presser part 161c is improved.

The left pressing member 162 comprises a basal part 162a fixed to the beam member 50, and a left presser part 162b formed integrally with the basal part 162a.

The basal part 162a has an extension part 162c extending leftward on an upper portion thereof. This extension part 162c is formed with along hole 162d extending in the lateral direction. The left pressing member 162 comprises an engagement pawl part 162e (see FIG. 12B) turning to the front face of the beam member 50 at the lower edge of the basal part 162a. Thereby, after the left pressing member 162 is tentatively fixed to the beam member 50 with a bolt B, the left pressing member 162 is freely movable to the right and left due to action between the long hole 162d and the engagement pawl part 162e.

The left presser part 162b is one example of the second presser part, and formed to extend from a lower part of the left edge of the basal part 162a once backwards and then to the right to be elastically deformable. And a top end part 62f of the left presser part 162b is curved forward, and tapered to be gradually narrower in width toward the top end. Further, the top end of this top end part 162f is formed like a circular arc.

The left presser part 162b presses the left side of the mirror package 22 with respect to the tilt axis TA by properly setting the length of the rightward extending part, the angle made between the rightward extending part and the backward extending part and the curved shape of the top end part 162f.

The positioning member 163 comprises a basal part 163a attached to the front face of the beam member 50, an upper wall 163b and a lower wall 163c extending from the upper and lower ends of the basal part 163a backward, and one pair of engagement parts 163d extending from the back end of the upper wall 163b and the lower wall 163c in the mutually confronting direction.

As shown in FIG. 10, the basal part 163a is formed with an opening portion 163e corresponding to the opening portion 51b of the beam member 50 (see FIG. 11A). Both the upper wall 163b and the lower wall 163c are formed to be gradually narrower in width toward the back part, and an engagement part 163d is formed at the narrowest back end.

The engagement part 163d is engaged with the upper and lower faces of the mirror package 22, whereby the mirror package 22 is positioned vertically (in the width direction of the beam member 50). Specifically, this engagement part 163d is formed to be gradually narrower from the back end of the upper wall 163b or lower end 63c toward the mirror package 22 so that the top ends are tapered.

As shown in FIG. 13A, the second fixing member 170 comprises a left block 171 disposed on the left side of the mirror package 22, a right block 172 disposed on the right side of the mirror package 22, and two leaf springs 173 fixed on the upper surface of the blocks 171 and 172.

The left block 171 is formed like a square pole, and has a detent projection 171a for the leaf sprint 173 formed on the upper face thereof. Also, a groove 171b is formed to penetrate right and left on an upper portion of the front face of the left block 171, and a long hole 171c is formed to penetrate back and forth on a bottom face of this groove 171b. And a block support member 174 freely slidable along the groove 171b is provided in this groove 171b. A screw-hole 174a is formed in this block support member 174. Thereby, the left block 171 is fixed to the frame 40 by screwing a screw (not shown) into the screw-hole 174a in a state where the left block 171 is sandwiched between the block support member 174 and the frame 40. If the screw is tentatively fastened, the left block 171 is movable right and left along the groove 171b, facilitating the lateral position adjustment on the frame 40.

In the right end portion on the front face of the left block 171, a spherical projection 171d as one example of the third projection projecting forward is formed at an appropriate position in the center of the left block 171, and an L-character shaped support part 171e projecting forward is formed at an appropriate position in the lower portion of the left block 171. The support part 171e comprises a base section 171f formed like a rectangular plate and a semi-cylindrical pedestal part 171g projecting forward out of the lower portion of the base section 171f, and supports the beam member 50 with a curved surface of this pedestal part 171g.

The right block 172 comprises a projection 172a, a groove 172b, a long hole 172c, and a block support member 174, like the left block 171, and further comprises a screw 175 provided at a left end portion on the front face of the right block 172 and a support part 172e. The screw 175 is screwed from the back of the right block 172, its top end 175a projecting out of the front face of the right block 172. A top end 175a of the projecting screw 175 corresponds to one example of a first projection. And the top end 175a of this screw 175 can move back and forth (in the direction along the pressing force of the leaf spring 173) by turning the screw 175

Also, the support part 172e comprises a pedestal part 172g, like the pedestal part 171g of the left block 171, and additionally comprises a base section 172f that is formed thicker than the base section 171f of the left block 171. Therefore, the base section 172f in this right block 172 projects forward of the base section 171f in the left block 171 to make contact with the beam member 50. Such projecting base section 172f corresponds to one example of a second projection.

The beam member 50 is supported at three points by the base section 172f, the top end 175a of the screw 175 and the spherical projection 171d. By properly moving back and forth the top end 175a of the screw 175, the tilting angle of the beam member 50 supported at three points is adjusted and further the tilting angle of the oscillating mirror 21 is adjusted.

The leaf spring 173 is an elastic member which presses the beam member 50 against each block 171, 172, and comprises a basal part 173a fixed on the upper face of each block 171, 172 and an arm part 173b formed integrally with the basal part 173a.

The basal part 173a has two holes, and fixed to each block 171, 172 by engaging the projection 171a, 172a of each block 171, 172 into one hole, and then screwing the screw N into the other hole. At this time, the leaf spring 173 is prevented from being turned together with the screw N in fixing the leaf spring 173 to each block 171, 172 by the screw N with one hole engaged by the projection 171a, 172a.

The arm part 173b extends upward from the front edge of the basal part 173a on the side of the mirror package 22, then forward, and downward, and is formed to be elastically deformable. The position of the top end of this arm part 173b in the lateral direction is matched with the position of the spherical projection 171d or the top end 175a of the screw 175 and the position of the base section 172f in a state where the basal part 173a is fixed to each block 171, 172 (see FIG. 13B). That is, the beam member 50 is held between the arm part 173b and the spherical projection 171d, as well as between the arm part 173b and the top end 175a of the screw 175 and the base section 172f.

In fixing the beam member 50 with the second fixing member 170 configured above, the spherical projection 171d and the leaf spring 173 are positioned at one node F1 of the primary natural oscillation in the beam member 50, and the top end 175a of the screw 175, the base section 172f and the leaf spring 173 are positioned at the other node F1 by properly adjusting the position of each block 171, 172, as shown in FIG. 13B. Thereby, the noise occurring from the beam member 50 oscillating due to the rotational oscillation of the oscillating mirror 21 can be suppressed.

Though in the second exemplary embodiment, the beam member 50 is fixed to the frame 40 only at the nodes F1, F1 of the primary natural oscillation, the invention is not limited thereto, but the beam member 50 may be fixed to the frame 40 only at the nodes F2, F2 of the secondary natural oscillation, or the beam member 50 may be fixed to the frame 40 both at the nodes F1, F1 of the primary natural oscillation and at the nodes F2, F2 of the secondary natural oscillation. In the case where the beam member 50 is fixed to the frame 40 both at the nodes F1, F1 of the primary natural oscillation and at the nodes F2, F2 of the secondary natural oscillation, the noise occurring from the beam member 50 can be suppressed more.

A method for mounting the oscillating mirror 21 on the frame 40 will be described below. Firstly, the oscillating mirror 21 is fixed in the mirror package 22, as shown in FIG. 4. Subsequently, this mirror package 22 is set in the concave portion 53 of the beam member 50 as shown in FIG. 11A, and then the positioning member 163 is engaged with the mirror package 22 to position the mirror package 22 on the beam member 50, as shown in FIG. 12A.

Next, the right pressing member 161 is fixed to the beam member 50, and the left pressing member 162 is tentatively fixed to the beam member 50. If the left pressing member 162 tentatively fixed is properly slid to the right or left, a left-hand moment and a right-hand moment, which are balanced around the tilt axis TA of the mirror package 22, are unbalanced so that the mirror package 22 is tilted. The mirror package 22 is stopped where the moments are balanced again at an angle. Thereby, the inclination of the mirror package 22 around the tilt axis TA is adjusted. After completion of this adjustment, the left pressing member 162 is fixed to the beam member 50 by tightly fastening the bolt B. Thereby, the mirror package 22 is fixed to the beam member 50 at a desired inclination.

After each block 171, 172 is tentatively fixed to the frame 40, the beam member 50 is laid on the pedestal part 171g, 172g of each block 171, 172, as shown in FIG. 13A. Subsequently, the leaf spring 173 is fixed to each block 171, 172, while the beam member 50 is held between the leaf springs 173 of the blocks 171 and 172. Thereafter, each tentatively fixed block 171, 172 is adjusted by sliding so that the leaf springs 173 may be located at the nodes F1, F1 of the primary natural oscillation. It is advantageous that the nodes F1, F1 are marked beforehand with paint or notch.

After adjusting the position of each block 171, 172, each block 171, 172 is fixed to the frame 40 by tightening a screw (not shown). Thereafter, the tilting angle of the beam member 50 and the tilting angle of the oscillating mirror 21 are adjusted by properly adjusting the screw 175. In the above manner, the oscillating mirror 21 is mounted at the proper position and angle on the frame 40.

According to the above configuration, the second exemplary embodiment may have the following effects.

Since the oscillating mirror 21 is mounted via the mirror package 22 on the beam member 50 which is larger and easier to handle than the oscillating mirror 21, the mounting operation of the oscillating mirror 21 on the frame 40 is facilitated. Also, the position and angle of the oscillating mirror 21 can be adjusted by moving the beam member 50 which is easier to handle, whereby the adjustment operation is also facilitated.

Since the nodes F1, F1 of the primary natural oscillation in the beam member 50 are fixed to the frame 40 (more particularly, each block 171, 172 fixed to the frame 40) by the second fixing member 170, the noise occurring from the beam member 50 oscillating due to the rotational oscillation of the oscillating mirror 21 can be suppressed.

Since the second fixing member 170 comprises the leaf spring 173, the position adjustment of the beam member 50 can be easily performed.

Since one of the projections supporting the beam member 50 at three points, that is, the top end 175a of the screw 175 is freely movable back and forth, the tilting angle of the beam member 50 (oscillating mirror 21) can be simply adjusted by turning the screw 175.

Since the left pressing member 162 which presses the left side of the mirror package 22 supported freely tiltably by one pair of tilting projections 51a can be freely moved right and left, the inclination of the mirror package 22 can be simply adjusted. Also, the top end part 162f of the left presser part 162b in the left pressing member 162 is tapered, and formed like a circular arc, whereby the lateral movement of the left pressing member 162 can be smooth.

Since the central presser part 161c for pressing the center of the back face of the mirror package 22 is provided, the mirror package 22 can be securely contacted with the tilting projection 51a.

Since the rotational oscillation axis RA of the oscillating mirror 21 is arranged on the plane of the rear face 52a of the beam member 50 owing to the concave portion 53 formed in the beam member 50, the tilting angle of the oscillating mirror 21 is also adjusted at the same angle as this back face 52a, if the tilting angle of the back face 52a of the beam member 50 is adjusted by moving the top end 175a of the screw 175 back or forth. That is, in the case where the position of the rotational oscillation axis RA is located away from the plane of the back face 52a, there is an error in the angle difference of the back face 52a before and after adjustment and the angle difference of the oscillating mirror 21 before and after adjustment, although this problem can be resolved by locating the rotational oscillation axis RA on the plane of the rear face 52a.

The present invention is not limited to the above second exemplary embodiment, for example, the following embodiments may also fall within the technical scope of the present invention.

Though in the above embodiment, the leaf spring 173 is employed as the elastic member, the invention is not limited thereto, but a coil spring may be employed.

Though in the above embodiment, the beam member 50 is pressed against each block 171, 172 by the leaf spring 173, the invention is not limited thereto, but the beam member may be directly pressed against the frame by directly fixing the leaf spring 173 to the frame.

Though in the above embodiment the first fixing member 160 and the second fixing member 170 are each composed of plural parts, the invention is not limited thereto, but may be composed of a single member.

Though in the above embodiment, the oscillating mirror 21 is horizontally disposed (in the orientation almost parallel to the bottom wall of the frame 40), the invention is not limited thereto, but the oscillating mirror 21 may be oriented upward (toward opposite to the bottom wall) or downward (toward the bottom wall). Specifically, configurations as shown in FIGS. 14 and 15 may be employed when the oscillating mirror 21 is oriented upward.

Figure 15:
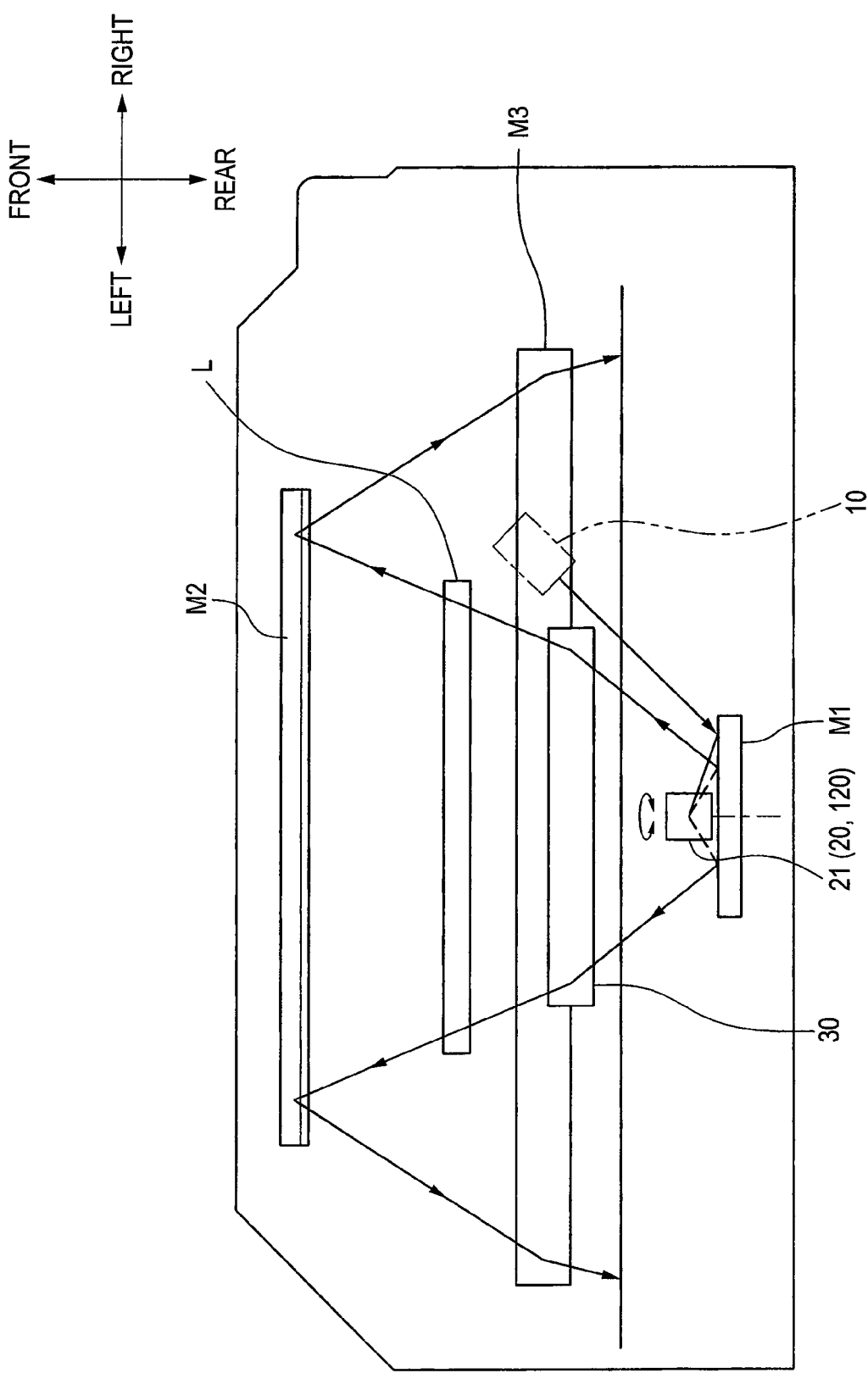
FIG. 15 is a plan view showing the form in which the oscillating mirror is oriented upward.

That is, in the configuration as shown in FIGS. 14 and 15, the arrangement of the light source unit 10, the first mirror M1 and the oscillating mirror unit 120 as shown in FIG. 2 is properly changed, and the arrangement of the other components (first scanning lens 30, second scanning lens L, second mirror M2 and third mirror M3) is substantially the same. Specifically, the oscillating mirror unit 120 is arranged on the bottom face of the frame 40 so that the oscillating mirror 21 may be oriented upward, as shown in FIG. 14. Above the oscillating mirror unit 20, 120, the first mirror M1 is arranged in the orientation of reflecting the light reflected from the oscillating mirror 21 to the first scanning lens 30. Further, the light source unit is arranged, right forward of the first mirror M1, so that the light emitted from this light source unit 10 can arrive via the first mirror M1 on the oscillating mirror 21.

With the above configuration, if the light is emitted from the light source unit 10, the light is reflected from the first mirror M1, and arrives on the oscillating mirror 21. And the light is properly deflected and reflected from the oscillating mirror 21, reflected again from the first mirror M1 to pass through the first scanning lens 30 and the second scanning lens L, and reflected from the second mirror M2 and the third mirror M3 in succession to be output to the outside. With the above configuration, the first mirror M1 and the oscillating mirror unit 20, 120 can be arranged vertically, whereby the apparatus can be reduced in size.

Figure 16:
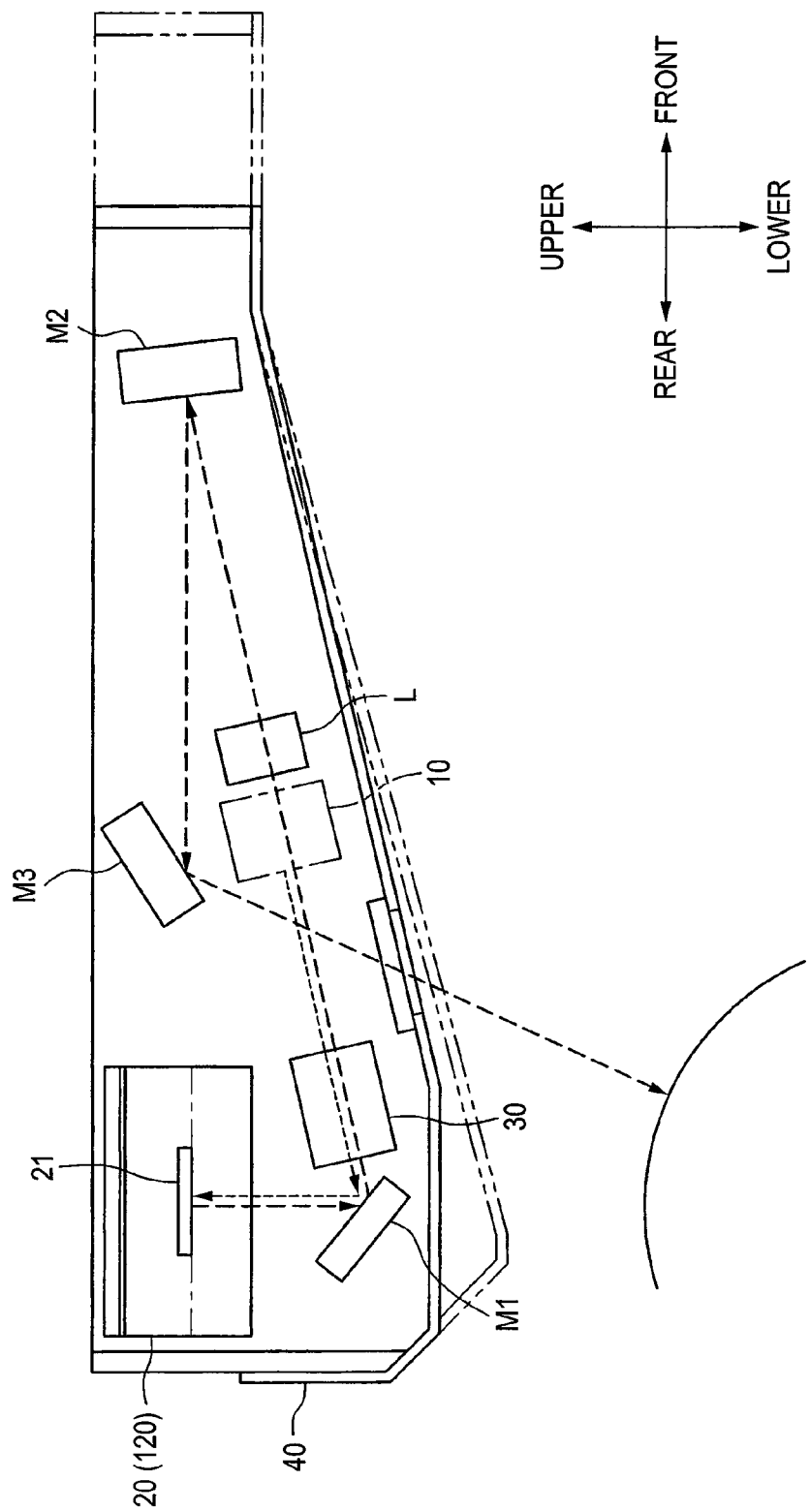
FIG. 16 is a side view showing a form in which the oscillating mirror is oriented downward.

Also, in the case where the oscillating mirror 21 is oriented downward, the oscillating mirror unit 20, 120 is arranged on the upper side of the frame 40 so that the oscillating mirror 21 may be oriented downward, as shown in FIG. 16, for example. Also, the first mirror M1 is arranged under the oscillating mirror unit 20, 120 in the orientation where the light reflected from the oscillating mirror 21 is reflected to the first scanning lens 30. Further, the light source unit 10 is arranged in front of the first mirror M1 (right or left forward of the first scanning lens 30), whereby the light emitted from the light source unit 10 arrives via the first mirror M1 on the oscillating mirror 21. Also, the second mirror M2 is arranged in the orientation where the light is reflected upward, and the third mirror M3 is arranged in the orientation where the reflected light passes between the first scanning lens 30 and the second scanning lens L. With the above constitution, the first mirror M1 and the oscillating mirror unit 120 can be arranged vertically, like the constitution in which the oscillating mirror 21 is oriented upward, whereby the apparatus can be reduced in size.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A light scanning device comprising:
a light source which emits light;
a frame which supports the light source;
an oscillating mirror which rotationally oscillates about a first axis to reflect the light emitted from the light source;
a mirror holder which holds the oscillating mirror;
a beam member which extends in a first direction orthogonal to the first axis and which is longer than the mirror holder in the first direction;
a first fixing member which fixes the mirror holder to the beam member; and
a second fixing member which fixes the beam member to the frame,
wherein the second fixing member fixes the beam member to the frame movably in the first direction,
the light scanning device further comprising an adjustment member which adjusts a position of the beam member in the first direction on the frame by pressing an end portion of the beam member.

2. The light scanning device according to claim 1,
wherein the adjustment member is disposed at one end of the beam member to be movable in a second direction different from the first direction, and
wherein the beam member includes a pressed face which is inclined with respect to the second direction and which contacts with the adjustment member,
the light scanning device further comprising an elastic member which is disposed at the other end of the beam member and presses the beam member to the one end of the beam member.

3. The light scanning device according to claim 2,
wherein the second direction is parallel to the first axis.

4. The light scanning device according to claim 2,
wherein the second direction is inclined with respect to the first axis, and
wherein the pressed face is parallel to the first axis.

5. The light scanning device according to claim 1,
wherein the adjustment member includes an eccentric cam.

6. The light scanning device according to claim 2,
wherein the adjustment member includes a screw.

7. The light scanning device according to claim 1,
wherein the second fixing member fixes the beam member to the frame at two portions which become nodes of a primary natural oscillation of the beam member.

8. The light scanning device according to claim 1,
wherein the second fixing member includes an elastic member which is used to sandwich and hold the beam member.

9. The light scanning device according to claim 8,
wherein the second fixing member includes a base which includes:
first and second projections which are arranged in parallel with the first axis; and
a third projection arranged opposite from the first and second projections with respect to the oscillating mirror, and
wherein the elastic member sandwiches and holds the beam member with the first to third projections between the elastic member and the first to third projections.

10. The light scanning device according to claim 9,
wherein at least one of the first and second projections is configured to be movable along a pressing direction of the elastic member.

11. The light scanning device according to claim 9,
wherein the third projection is configured to be movable along a pressing direction of the elastic member.

12. The light scanning device according to claim 1,
wherein second fixing member further includes a presser part which presses the beam member to the frame.

13. The light scanning device according to claim 9,
wherein the beam member is provided with a concave portion where the mirror holder is disposed so that the first axis is positioned on a plane defined with the first to third projections.

14. The light scanning device according to claim 1,
wherein the first fixing member includes an opening through which light incident to the oscillating mirror and light reflected by the oscillating mirror pass.

15. The light scanning device according to claim 1,
wherein the beam member includes an opening through which light incident to the oscillating mirror and light reflected by the oscillating mirror pass.

16. A light scanning device comprising:
a light source which emits light;
a frame which supports the light source;
an oscillating mirror which rotationally oscillates about a first axis to reflect the light emitted from the light source;
a mirror holder which holds the oscillating mirror;
a beam member which extends in a first direction orthogonal to the first axis and which is longer than the mirror holder in the first direction;
a first fixing member which fixes the mirror holder to the beam member; and
a second fixing member which fixes the beam member to the frame,
wherein the second fixing member fixes the beam member to the frame at two portions which become nodes of a primary natural oscillation of the beam member.

17. The light scanning device according to claim 16,
wherein the second fixing member fixes the beam member to the frame at two portions which become nodes of a secondary natural oscillation of the beam member.

18. The light scanning device according to claim 16,
wherein the second fixing member includes a third elastic member which is used to sandwich and hold the beam member.

19. The light scanning device according to claim 18,
wherein the second fixing member includes a base which includes first to third projections which contact with the beam member; and
wherein the third elastic member sandwiches and holds the beam member with the first to third projections between the third elastic member and the first to third projections.

20. The light scanning device according to claim 19,
wherein the base includes first and second bases, and
wherein the first and second projections are provided on the first base and the third projection is provided on the second base.

21. The light scanning device according to claim 19,
wherein at least one of the first and second projections is configured to be movable along a pressing direction of the elastic member.

22. A light scanning device comprising:
a light source which emits light;
a frame which supports the light source;
an oscillating mirror which rotationally oscillates about a first axis to reflect the light emitted from the light source;
a mirror holder which holds the oscillating mirror;
a beam member which extends in a first direction orthogonal to the first axis and which is longer than the mirror holder in the first direction;
a first fixing member which fixes the mirror holder to the beam member; and
a second fixing member which fixes the beam member to the frame;
wherein the first fixing member includes a presser part which presses the mirror holder to be fixed to the beam member.

23. The light scanning device according to claim 22,
wherein the beam member includes a supporting projection which supports the mirror holder and allows the mirror holder to tilt about a second axis in parallel with the first axis, and
wherein the presser part of the first fixing member includes:
a first presser part which is elastically deformable and which presses the mirror holder at one side thereof;
a second presser part which is elastically deformable and movable in the first direction and which presses the mirror holder at the other side thereof with respect to the second axis.

24. The light scanning device according to claim 23,
wherein the first fixing member further includes an engagement part which is engaged with the mirror holder and positions the mirror holder in a direction parallel to the first axis.

25. The light scanning device according to claim 23,
wherein the presser part of the first fixing member further includes a third presser part which is elastically deformable and which contacts with the mirror holder at a position rear from the second axis.

26. The light scanning device according to claim 21,
wherein the beam member is provided with a concave portion where the mirror holder is disposed so that the first axis is positioned on a plane defined with the first to third projections.

* * * * *